United States Patent
Döring

(10) Patent No.: US 8,173,074 B2
(45) Date of Patent: *May 8, 2012

(54) APPARATUS FOR REDUCING DIBENZODIOXIN EMISSIONS AND DIBENZOFURAN EMISSIONS FROM TRANSITION METAL-CONTAINING CATALYZERS

(75) Inventor: Andreas Döring, Munich (DE)

(73) Assignee: MAN Truck & Bus AG, München (DE)

( * ) Notice: Subject to any disclaimer, the term of this patent is extended or adjusted under 35 U.S.C. 154(b) by 612 days.

This patent is subject to a terminal disclaimer.

(21) Appl. No.: 12/355,930

(22) Filed: Jan. 19, 2009

(65) Prior Publication Data

US 2009/0199549 A1 Aug. 13, 2009

(30) Foreign Application Priority Data

Feb. 12, 2008 (DE) .................. 10 2008 008 748

(51) Int. Cl.
*B01D 53/34* (2006.01)
*F01N 3/10* (2006.01)

(52) U.S. Cl. ........ 422/177; 422/180; 423/210; 423/212; 60/300; 60/302

(58) Field of Classification Search .................. 422/171, 422/177, 180; 423/210, 212; 60/299, 300, 60/274, 302

See application file for complete search history.

(56) References Cited

U.S. PATENT DOCUMENTS

| 3,824,196 A | 7/1974 | Benbow |
| 4,902,487 A | 2/1990 | Cooper |
| 5,017,538 A | 5/1991 | Takeshima |
| 6,737,033 B1 | 5/2004 | Hofmann et al. |
| 7,357,900 B2 * | 4/2008 | Bartley et al. ................. 422/168 |
| 7,481,983 B2 | 1/2009 | Patchett et al. |
| 7,506,504 B2 * | 3/2009 | Kumar ............. 60/299 |
| 7,802,419 B2 * | 9/2010 | Doring ............. 60/286 |
| 7,850,934 B2 * | 12/2010 | Doring ............. 423/212 |
| 7,856,809 B2 * | 12/2010 | Doring ............. 60/295 |
| 7,998,423 B2 * | 8/2011 | Boorse et al. ................. 422/180 |
| 2005/0034450 A1 | 2/2005 | Itoh et al. |
| 2007/0243120 A1 | 10/2007 | Sato |
| 2008/0202107 A1 * | 8/2008 | Boorse et al. ................... 60/301 |

FOREIGN PATENT DOCUMENTS

| DE | 10327030 | 1/2005 |
| EP | 1072765 | 1/2001 |
| EP | 1602403 | 12/2005 |
| EP | 1795724 | 6/2007 |
| JP | 2004376102 | 12/2004 |
| WO | WO 9949956 | 10/1999 |
| WO | WO 2008/006427 | 1/2008 |

\* cited by examiner

*Primary Examiner* — Nina Bhat
(74) *Attorney, Agent, or Firm* — Cozen O'Connor

(57) ABSTRACT

A device for reducing the emission of polychlorinated dibenzodioxins (PCDD) and polychlorinated dibenzofurans (PCDF) from transition metal-containing catalyzers for selective catalytic reduction of nitric oxides in the exhaust gas of an internal combustion engine by means of ammonia and/or reducing agents which split off ammonia. At least one catalyzer for oxidizing hydrocarbon-containing PCDD precursor substances and PCDF is arranged upstream of the at least one transition metal-containing SCR catalyzer and/or at least one catalyzer for degrading precursor substances for degrading the polychlorinated dibenzodioxins and/or polychlorinated dibenzofurans is arranged downstream of the at least one transition metal-containing catalyzer. The at least one catalyzer for degrading PCDD and PCDF and/or the at least one catalyzer for oxidizing hydrocarbon-containing precursor substances thereof are/is additionally active for the reduction of nitric oxides by means of ammonia.

16 Claims, No Drawings

APPARATUS FOR REDUCING DIBENZODIOXIN EMISSIONS AND DIBENZOFURAN EMISSIONS FROM TRANSITION METAL-CONTAINING CATALYZERS

BACKGROUND OF THE INVENTION

1. Field of the Invention

The invention is directed to an apparatus for reducing PCDD and PCDF emissions from SCR catalyzers which reduce nitric oxides in the exhaust gas of the internal combustion engine by means of ammonia.

2. Description of the Related Art

Nitric oxides are some of the limited components of exhaust gas which are formed during combustion processes. Permissible emissions of these components with respect to the environment continue to be lowered. Reduction of nitric oxides is usually accomplished by means of catalyzers; reducing agents are additionally required in oxygen-rich exhaust to increase selectivity and $NO_x$ conversion. This method is referred to as selective catalytic reduction, or SCR, and has been used in the energy industry since 1980. $V_2O_5$-containing mixed oxides, e.g., in the form of $V_2O_5/WO_3/TiO_2$, can be used as SCR catalyzers. $V_2O_5$ proportions typically range between 0.2% and 3%. Ammonia or compounds which split off ammonia such as urea or ammonia formiate are used in solid form or in solution as reducing agents. The reaction proceeds as follows:

$$4NO+4NH_3+O_2 \Rightarrow 4N_2+6H_2O \tag{1}$$

Special problems arise when using the SCR method to reduce nitric oxides in internal combustion engines, especially in vehicles, because emission of unspent ammonia must be prevented. Unlike in the energy industry, there are no sufficiently accurate, durable exhaust gas sensors available for regulating the system in vehicles and, therefore, for preventing $NH_3$ emissions in the event of excessive dosing.

Particle separators, as they are called, or particle filters are used in the energy industry and in vehicles to minimize fine particles.

A typical arrangement with particle separators for use in vehicles is described, for example, in EP 1 072 765 A1. Arrangements of this kind differ from those using particle filters in that the diameter of the channels in the particle separator is substantially greater than the diameter of the largest occurring particle, while the diameter of the filter channels in particle filters is in the range of the diameter of the particles. Due to this difference, particle filters are subject to blockage, which increases the exhaust gas counterpressure and lowers engine performance. An arrangement and a method with particle filters are shown in U.S. Pat. No. 4,902, 487. A distinguishing feature of the two above-mentioned arrangements and methods is that the oxidation catalyzer—usually a catalyzer with platinum as active material—arranged upstream of the particle separator or particle filter oxidizes the nitrogen monoxide in the exhaust gas to form nitrogen dioxide by means of the residual oxygen which is also contained.

$$2NO+O_2 \Leftrightarrow 2NO_2 \tag{2}$$

In this regard, it must be ensured that the equilibrium of the above reaction lies on the side of NO at high temperatures. As a result, the achievable $NO_2$ proportions are limited at high temperatures due to this thermodynamic limitation.

$$NO+2NH_3+NO_2 \Rightarrow 2N_2+3H_2O \tag{3}$$

This $NO_2$ is in turn converted in the particle separator or particle filter with the carbon particles to form CO, $CO_2$, $N_2$ and NO.

There is a continuous removal of the deposited fine particles by means of the powerful oxidizing agent $NO_2$, so that regeneration cycles such as those which must be laboriously carried out in other arrangements are dispensed with. For this reason, this is referred to as "passive" regeneration.

$$2 NO_2+C \Rightarrow 2 NO+CO_2 \tag{3}$$

$$NO_2+C \Rightarrow NO+CO \tag{4}$$

$$2 C+2 NO_2 \Rightarrow N_2+2CO_2 \tag{5}$$

If the $NO_2$ does not succeed in effecting a complete oxidation of the carbon embedded in the particle filter, the carbon proportion and, therefore, the exhaust gas counterpressure increases steadily.

At the present time, this is prevented by providing the particle filters with a catalytic coating for the oxidation of NO. As was already described above, these catalyzers usually contain platinum. The disadvantage of this method is that the $NO_2$ formed at the particle filter can only be used for oxidation of particles which have been separated out downstream of the catalytically active layer for NO oxidation, that is, inside the filter medium. However, if a layer of separated particles, or a filter cake as it is called, should form on the filter surface and, therefore, on the catalytically active layer, the NO oxidation catalyzer lies downstream of the filter cake so that the soot particles separated out at that location cannot be oxidized by means of $NO_2$ from the NO oxidation catalyzer arranged on the particle filter.

In addition, only the catalyzer layer arranged on the raw gas side contributes, strictly speaking, to the performance of the system because the $NO_2$ that is formed catalytically on the purified gas side can no longer come into contact with the soot deposited on the raw gas side and inside the filter material.

Another problem arising from the coating of the particle filter is that the geometric surfaces of the filter are appreciably smaller than those of the catalyzer substrates that are normally used. The reason for this is that the filters require relatively large free cross sections and, therefore, free volume on the raw gas side so that soot and engine oil ashes can be embedded. When ceramic filter substrates are used, this is implemented by means of a low porosity of 50 cpsi to 200 cpsi. On the other hand, simple catalyzers are usually constructed with cell densities of 400 cpsi to 900 cpsi. An increase from 50 cpsi to 900 cpsi results in an increase in the geometric surface from 1 $m^2/l$ to 4 $m^2/l$, which makes possible substantially increased throughputs at the catalyzers.

For these reasons, an NO oxidation catalyzer cannot be omitted in front of the particle filter in spite of the catalytic coating of the filter. This leads to a relatively large structural volume. This is the case even when the NO oxidation catalyzer and particle filters form a constructional unit by constructing the input area of the particle filter as an NO oxidation catalyzer (DE10327030 A1).

Although these steps allow soot oxidation up to temperatures of 250° C., there are applications in which even these exhaust gas temperatures cannot be reached and, therefore, reliable functioning of the particle filters cannot be ensured. This normally occurs in lightly loaded engines installed in vehicles, for example, in passenger cars, public buses, and garbage collection trucks, which, moreover, also have high idling proportions.

Therefore, a second possibility for particle filter regeneration is applied especially in these cases: this consists in actively raising the exhaust gas temperature. Usually this is accomplished by adding hydrocarbons upstream of oxidation catalyzers. The exothermal oxidation of the hydrocarbons at the catalyzers leads to an appreciable rise in temperature.

When the temperature is increased to more than 600° C. in this way, the carbon is oxidized by means of oxygen.

$$C + O_2 \rightarrow CO_2 \qquad (6)$$

However, the risk in this so-called "active" filter regeneration is that the burning of the soot will lead to a sharp uncontrolled rise in temperature of up to 1000° C. and, therefore, usually to damage to the particle filter and/or catalyzers arranged downstream.

Since the temperature increase must be maintained for several minutes to ensure a quantitative oxidation of the soot particles, the need for hydrocarbons is significant and, because the fuel in the internal combustion engine is usually used as a source of hydrocarbons, its efficiency is impaired.

The addition of hydrocarbons can be carried out by means of a separate injection nozzle arranged in the exhaust system. Another possibility is to generate high hydrocarbon emissions by means of a delayed after-injection of fuel into the combustion chamber.

In order to meet future exhaust gas regulations, it will be necessary to use arrangements for reducing nitric oxide emissions and arrangements for reducing fine particles emissions at the same time.

One solution is to coat the particle filter with SCR-active material (JP 2004-376102). In this connection, the use of $V_2O_5$ as an SCR-active component is difficult. This is due to the poor thermal stability of these catalyzers. Exhaust gas temperatures of more than 650° C. lead to sublimation of $V_2O_5$. Since these temperatures can easily occur in particle filters, as was already mentioned above, $V_2O_5$-free catalyzers containing transition metals, especially iron-, cobalt-, or copper-containing catalyzers, are used for these and other high-temperature applications. The integration of these transition metals through ion exchange in zeolites has proven to be particularly advantageous in this connection (U.S. Pat. No. 5,017,538). In this way, because of the very large surface of the zeolites, it is possible to substantially enlarge the active surface and accordingly appreciably increase the achievable throughput.

The disadvantage of these transition metal-containing catalyzers, however, is that they form highly toxic polychlorinated dibenzodioxins (PCDD) and polychlorinated dibenzofurans (PCDF) in the presence of chloride and hydrocarbons in the temperature range between 200° C. and 400° C.

In the vehicle, the chloride needed for dioxin formation reaches the exhaust gas and, accordingly, the catalyzers, e.g., through biofuels, the engine oil, or the intake air (salt spraying in winter, driving in coastal regions). The hydrocarbons needed for the formation of PCDD and PCDF are contained in the exhaust gas in any case because of incomplete combustion of the fuel.

SUMMARY OF THE INVENTION

The method according to the invention solves the problem of the formation and emission of polychlorinated dibenzodioxins and polychlorinated dibenzofurans in transition metal-containing catalyzers, especially iron-containing and/or cobalt-containing and/or copper-containing catalyzers.

The basic idea is that a catalyzer for degrading dioxins and furans is arranged downstream of the copper-containing and/or iron-containing and/or cobalt-containing catalyzer and/or a catalyzer for oxidizing hydrocarbon-containing dioxin precursor substances and furan precursor substances are/is arranged upstream of the copper-containing and/or iron-containing and/or cobalt-containing catalyzer, wherein the catalyzer arranged downstream for degrading PCDD and/or PCDF and the catalyzer arranged upstream for oxidizing hydrocarbon-containing dioxin precursor substances and furan precursor substances also have, in addition, an SCR activity in the presence of ammonia. By combining two functions, namely the degradation of PCDD, PCDF, PCDD precursor substances and PCDF precursor substances and the reduction of nitric oxides by means of $NH_3$, the constructional volume of the entire exhaust gas post-treatment system can be kept small.

In this connection, the use of titanium dioxide-bearing and tungsten oxide-stabilized vanadium pentoxide ($V_2O_5/WO_3/TiO_2$) has proven particularly advantageous. As was already described above, it has a very good SCR activity in addition to a high PCDD-oxidizing and PCDF-oxidizing activity. However, when using $V_2O_5$ it must be ensured that the exhaust gas temperatures at the $V_2O_5$-containing catalyzers do not exceed 650° C. This is accomplished by arranging these catalyzers downstream of the transition metal-containing SCR catalyzers. Due to their thermal mass, the SCR catalyzers attenuate any temperature spikes that might occur and accordingly protect the vanadium-containing catalyzers from thermal damage.

If this is not sufficient, the heat transfer to the environment upstream of the vanadium-containing catalyzers can be improved. This increases the heat losses of the exhaust gas so that, in turn, the exhaust gas temperatures decrease. The heat transfer can be improved by cooling the exhaust gas, e.g., by means of cooling ribs, through localized separation of the transition metal-containing SCR catalyzers and the PCDD-degrading catalyzer, for example, by installing them in separate sound dampers and/or by lengthening the exhaust gas line.

It is possible to improve the thermal properties of vanadium by embedding vanadium and/or oxides thereof in a zeolite structure by ion exchange like the active components of the SCR catalyzer. By incorporating in the zeolite framework, the sublimation temperatures are increased considerably due to the high steam pressures within the pore structure so that vanadium can be used even up to 750° C.

In this connection, the following framework types have proven to be particularly advantageous: AEN, OSI, EPI, ERI, FER, FAU, OFF, MFI, LTL, VFI, MAZ, MEI, EMT, CHA, KFI, BEA, MFS, MEL, MTW, EUO, MTT, HEU, FER, TON and MOR. The above-mentioned designations conform to the IZA (International Zeolite Association) nomenclature. The above-mentioned framework structures include the following zeolites: Mordenite, Epistilbite, Chabazite, Erionite, Mazzite, Ferrierite, Faujasite, Offretite, ZSM-3, ZSM-4, ZSM-5, ZSM-12, ZSM-18, ZSM-20, ZSM-22, ZSM-23, ZSM-34, ZSM-35, ZSM-38, ZSM-48, ZSM-50, Omega, Beta, Zeolite A, Zeolite L, Zeolite Y, Zeolite X, ZK-4, ZK-5, ZK-14, ZK-20, ZK-21 and ZK-22. These materials are accordingly suitable individually or in any combination for producing the PCDD- and/or PCDF-degrading catalyzers and the oxidation catalyzers for degrading PCDD precursor substances and/or PCDF precursor substances.

Of course, the zeolites mentioned above can also be used for producing the transition metal-containing SCR catalyzer.

Naturally, other elements having SCR activity and PCDD- and/or PCDF-degrading activity apart from vanadium can also be used. Such elements include tungsten, titanium, lanthanum, molybdenum, cerium, or manganese. As was already described with respect to vanadium, these materials can also be embedded in a zeolite structure resulting in higher throughputs in addition to improved thermal stability. This also applies to the active components of the catalyzers for oxidizing PCDD precursor substances and/or PCDF precursor substances such as tungsten, vanadium, lanthanum, molybdenum, cerium, or manganese.

On the other hand, if there is no risk of thermal damage to the $V_2O_5$-containing catalyzers, it is also possible to arrange them upstream of the transition metal-containing SCR catalyzers so that oxidation of the PCDD precursor substances and/or PCDF precursor substances is achieved, as was mentioned above, so as to prevent formation of polychlorinated dibenzodioxins and polychlorinated dibenzofurans.

The best protection against emission of PCDD and PCDF is achieved by arranging the $V_2O_5$-containing catalyzers upstream and downstream of the iron-containing and/or cobalt-containing and/or copper-containing SCR catalyzers.

The use of $V_2O_5$-containing catalyzers, which has already been mentioned repeatedly, is intended to serve as an example. All active substances causing a degradation of PCDD and/or PCDF and or an oxidation of their precursor substances can, of course, be used.

If there is no risk of thermal damage to the catalyzers, it is possible to install at least two of the three possible types of catalyzer—transition metal-containing SCR catalyzer, catalyzer for oxidizing PCDD precursor substances and/or PCDF precursor substances, and catalyzer for degrading PCDD and PCDF—together in a sound damper.

All of the catalyzers described above can be produced by extrusion or by coating a ceramic or metal carrier. Extrusion usually results in honeycomb catalyzers with parallel flow channels (U.S. Pat. No. 3,824,196), whereas with metal catalyzer carriers the shape and orientation of the flow channels can be freely selected to a great extent.

The transition metal-containing SCR catalyzer and the PCDD- and/or PCDF-degrading catalyzer and oxidizing catalyzer for PCDD precursor substances and/or PCDF precursor substances can form a structural unit in that at least two of the catalyzer types mentioned above are arranged or extruded on a common catalyzer substrate or are formed by separated substrates which are joined to form a structural unit. By "substrate" is meant a carrier in the broadest sense.

For example, when an SCR catalyzer and a PCDD- and/or PCDF-degrading catalyzer form a structural unit, they can be arranged one behind the other in the simplest case. This is accomplished, for example, by coating the catalyzer substrate or filter substrate with transition metal-containing SCR-active material on the inlet side and with material with PCDD- and/or PCDF-degrading activity and SCR activity on the outlet side. This is usually achieved by arranging different washcoats followed by drying and calcination. The same applies when an SCR catalyzer and a catalyzer for oxidizing the PCDD precursor substances and/or PCDF precursor substances are structurally joined; however, in this case the transition metal-containing catalyzer is located downstream of the catalyzer for oxidizing the PCDD precursor substances and/or PCDF precursor substances.

If it is necessary to install a particle filter in the exhaust gas system to reduce the particle emissions, this particle filter can be coated with at least one of the catalyzer types described above. Accordingly, separate catalyzer substrates can be dispensed with, at least in part.

It is possible, for example, to provide the purified gas side and/or the raw gas side of the particle filter substrate with a catalytically active layer for degrading PCDD and PCDF. Several different methods may be chosen for this purpose.

For one, the arrangement of a PCDD- and/or PCDF-degrading layer on the purified gas side and/or raw gas side similar to the coating of catalyzer substrates with a catalyzer washcoat is possible. This layer must then be dried and calcinated similar to the catalyzer substrates to ensure a stable, firm connection between itself and the filter substrate and/or transition metal-containing SCR catalyzer which can also be arranged on the filter substrate. However, when coating the filter substrate with the transition metal-containing catalyzer and the PCDD- and/or PCDF-degrading catalyzer, it must be ensured that the latter is always arranged downstream of the transition metal-containing catalyzer, that is, in the direction of the purified gas side of the filter substrate. As was already mentioned above, the PCDD- and/or PCDF-degrading layer can include tungsten, lanthanum, molybdenum, cerium, manganese, vanadium and/or zeolites.

On the other hand, it is also possible to form a PCDD- and/or PCDF-degrading layer by impregnating the transition metal-containing SCR catalyzer arranged on the filter substrate with the corresponding active components. As was already mentioned above, the impregnation must be carried out on the surface of the transition metal-containing catalyzer facing the purified gas side.

Another possibility for producing a particularly thin PCDD- and/or PCDF-degrading layer, particularly when zeolite-containing SCR catalyzers are used, is to substitute the concentration of at least one transition metal at the catalyzer surface with a different ion having a PCDD-oxidizing or PCDF-oxidizing activity through ion exchange. In the simplest case, this is accomplished by introducing an acidic fluid. In so doing, the transition metal ions in the zeolite structure are replaced by protons from the acidic fluid. The protons are subsequently exchanged for metal cations with PCDD-oxidizing activity. As was already described above, tungsten, lanthanum, molybdenum, cerium, manganese, or vanadium can be used for this purpose. Depending on the affinity of these elements, the intermediate step of protonization can be omitted and the transition metals can be directly exchanged through selection of a suitable pH.

The method described above for forming the PCDD-degrading and PCDF-degrading layer on a particle filter can also be applied in an advantageous manner for the layer for degradation of the PCDD precursor substances and PCDF precursor substances. The basic difference consists in that, when there is a transition metal-containing catalyzer on the particle filter, this layer is always arranged on the surface of the transition metal-containing catalyzer facing the raw gas side.

The particle filter can be made of sintered metal and/or ceramic and/or filter foam and/or ceramic fibers and/or quartz fibers and/or glass fibers and/or silicon carbide and/or aluminum titanate.

A sufficiently large geometric surface of the PCDD- and/or PCDF-degrading catalyzer and/or of the catalyzer for oxidizing the PCDD precursor substances and/or PCDF precursor substances is necessary in order to ensure the best possible quantitative degradation of PCDD, PCDF and/or precursor substances thereof. Therefore, their geometric surface is generally in the range of 30% to 300% of the surface of the transition metal-containing SCR catalyzer.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

I claim:

1. Apparatus for reducing emissions of polychlorinated dibenzodioxins (PCDD) and polychlorinated dibenzofurans (PCDF) in exhaust gas of an internal combustion engine, the apparatus comprising:
   a particle filter having an inlet side and an outlet side;
   a transition metal-containing catalyzer for the selective catalytic reduction of nitric oxides in the exhaust gas by at least one of: ammonia and reducing agents that split off ammonia; and
   at least one of
   a catalyzer for oxidizing hydrocarbon-containing PCDD and PCDF precursor substances arranged upstream of the transition metal-containing catalyzer; and
   a catalyzer for degrading at least one of PCDD and PCDF arranged downstream of the transition metal-containing catalyzer;
   wherein at least one of said catalyzer for oxidizing hydrocarbon-containing PCDD and PCDF precursor substances and said catalyzer for degrading at least one of PCDD and PCDF is active for reducing nitric oxide in the presence of ammonia; and
   wherein the transition metal-containing catalyzer is formed on the particle filter and the catalyzer for oxidizing hydrocarbon-containing PCDD and PCDF precursor substances is formed on the inlet side of the particle filter.

2. The apparatus of claim 1 wherein the transition metal-containing catalyzer contains at least one of iron, copper, and cobalt.

3. The apparatus of claim 1 wherein the catalyzer for degrading at least one of PCDD and PCDF contains at least one of tungsten, titanium, lanthanum, molybdenum, cerium, manganese, vanadium, and oxides thereof.

4. The apparatus of claim 1 wherein the catalyzer for oxidizing hydrocarbon-containing PCDD and PCDF precursor substances includes a metal selected from the group of tungsten, titanium, lanthanum, molybdenum, cerium, manganese, vanadium, and oxides thereof.

5. The apparatus of claim 1 wherein at least one of the catalyzers contains zeolites.

6. The apparatus of claim 1 wherein at least one of the catalyzers contains a zeolite framework a framework type selected from the group of AEN, OSI, EPI, ERI, FER, FAU, OFF, MFI, LTL, VFI, MAZ, MEI, EMT, CHA, KFI, BEA, MFS, MEL, MTW, EUO, MTT, HEU, FER, TON, and MOR.

7. The apparatus of claim 1 wherein at least one of the catalyzers contains at least one zeolite selected from the group consisting of Mordenite, Epistilbite, Chabazite, Erionite, Mazzite, Ferrierite, Faujasite, Offretite, ZSM-3, ZSM-4, ZSM-5, ZSM-12, ZSM-18, ZSM-20, ZSM-22, ZSM-23, ZSM-34, ZSM-35, ZSM-38, ZSM-48, ZSM-50, Omega, Beta, Zeolite A, Zeolite L, Zeolite Y, Zeolite X, ZK-4, ZK-5, ZK-14, ZK-20, ZK-21, and ZK-22.

8. The apparatus of claim 1 wherein at least one of the catalyzers comprises an extruded carrier.

9. The apparatus of claim 1 wherein the transition metal-containing catalyzer for the selective catalytic reduction of nitric oxides and at least one of the upstream catalyzer and the downstream catalyzer form a structural unit.

10. The apparatus of claim 1 further comprising a carrier having an inlet side and an outlet side, the transition metal-containing catalyzer for the selective catalytic reduction of nitric oxides being formed on the inlet side, the catalyzer for degrading at least one of PCDD and PCDF being formed on the outlet side.

11. The apparatus of claim 1 further comprising a carrier having an inlet side and an outlet side, the transition metal-containing catalyzer for the selective catalytic reduction of nitric oxides being formed on the outlet side, the catalyzer for oxidizing PCDD and PCDF precursor substances being formed on the inlet side.

12. The apparatus of claim 1, wherein the transition metal-containing catalyzer for the selective catalytic reduction of nitric oxides is formed on the inlet side, the catalyzer for degrading at least one of PCDD and PCDF is formed on the outlet side.

13. The apparatus of claim 1 wherein the particle filter is made of at least one of metal, sintered metal, ceramic, foam, ceramic fibers, quartz fibers, glass fibers, silicon carbide, and aluminum nitrate.

14. The apparatus of claim 1 wherein the catalyzers each have a geometric surface, the geometric surface of at least one of the catalyzer for oxidizing hydrocarbon -containing PCDD and PCDF precursor substances and the catalyzer for degrading at least one of PCDD and PCDF being at least 30% and at most 300% of the geometric surface of the transition metal-containing catalyzer.

15. The apparatus of claim 1, wherein the at least one of the catalyzer for oxidizing hydrocarbon-containing PCDD and PCDF precursor substances and the catalyzer for degrading at least one of PCDD and PCDF is formed from a layer containing a transition metal -containing zeolite applied as a coating on the particle filter, wherein the concentration of at least one transition metal in a surface of the coating facing one of the input side and the output side is changed by ion exchange for a metal to form the at least one of the catalyzer for oxidizing hydrocarbon-containing PCDD and PCDF precursor substances and the catalyzer for degrading at least one of PCDD and PCDF.

16. The apparatus of claim 1, wherein the at least one of the catalyzer for oxidizing hydrocarbon-containing PCDD and PCDF precursor substances and the catalyzer for degrading at least one of PCDD and PCDF is formed by one of a washcoat on and impregnation in the particle filter.

* * * * *